April 30, 1929. H. P. ARNT 1,711,166
HYDRAULIC SHOCK ABSORBER
Filed Jan. 26, 1927
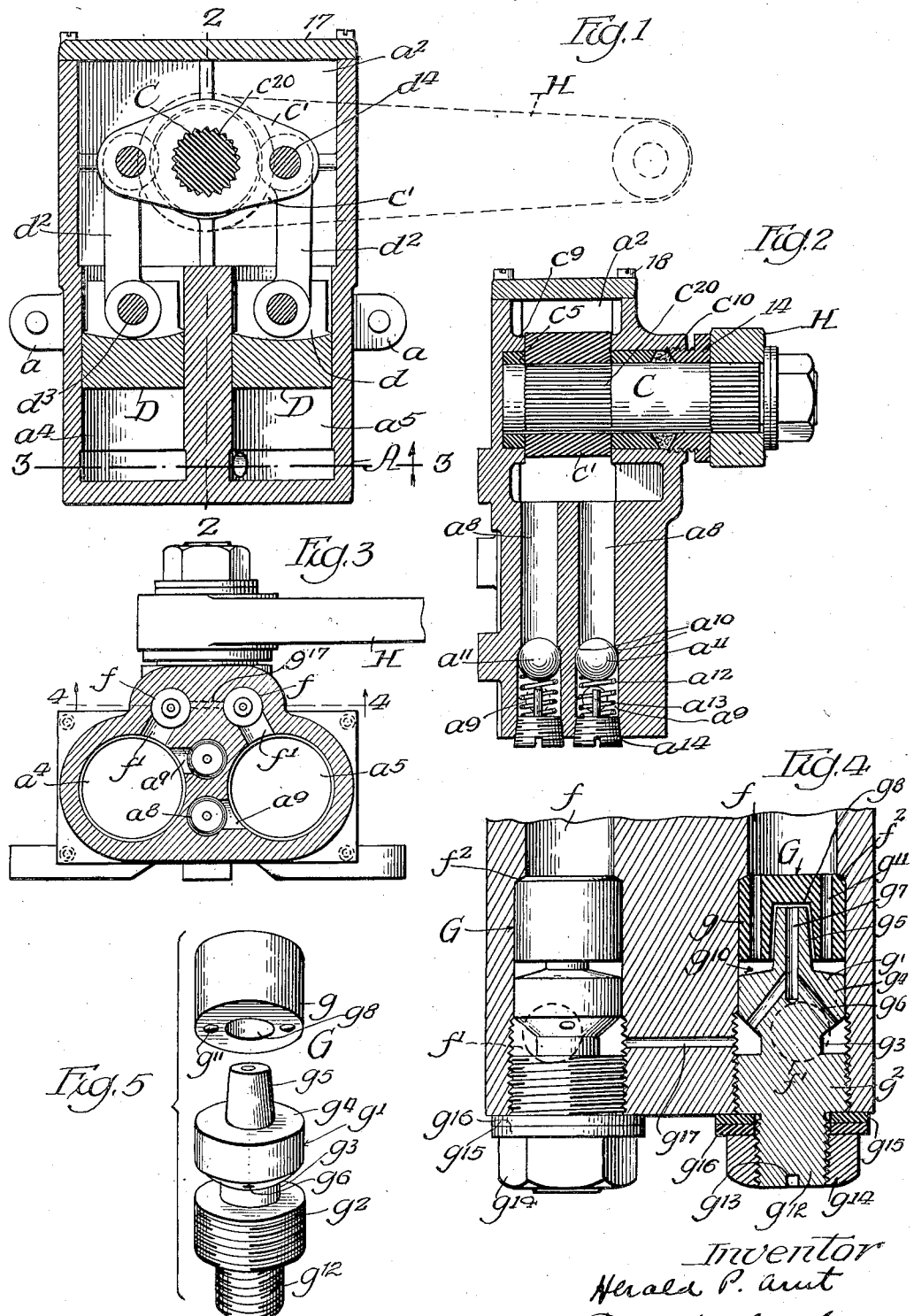
Inventor
Herald P. Arnt
By Fred Gerlach
his Atty Patented Apr. 30, 1929.

1,711,166

UNITED STATES PATENT OFFICE.

HERALD P. ARNT, OF JACKSON, MICHIGAN.

HYDRAULIC SHOCK ABSORBER.

Application filed January 26, 1927. Serial No. 163,641.

The invention relates to hydraulic shock absorbers for vehicles.

In hydraulic shock absorbers for vehicles, it has been found, in practice, that when a spring or pressure-closed valve is used to restrict or control the outlet of liquid from the cylinder during the compression stroke, the initial retardance, until the valve has been opened, effects the smoothness with which the vehicle is retarded, and one object of the invention is to provide a shock absorber of this type in which a valve, which moves to open and closed position for controlling the outlet of the liquid from the cylinder, is dispensed with. In practice, it has also been found that the liquid being forced out of the cylinder during the compression stroke through a restricted outlet port produces an objectionable noise, and another object of the invention is to provide a controlling device by which this noise is muffled or eliminated.

Another object of the invention is to provide a device which dispenses with a movable valve and in which the sound will be muffled, which can be manufactured and assembled at a low cost, and in which provision is made for varying the rate of discharge to regulate the operation of the shock absorber. Other objects of the invention will appear from the detail description.

The invention consists in the several novel features hereinafter set forth and more particularly defined by claims at the conclusion hereof.

In the drawing: Fig. 1 is a vertical section of a shock absorber embodying the invention. Fig. 2 is a vertical transverse section. Fig. 3 is a section taken on line 3—3 of Fig. 1. Fig. 4 is a section on an enlarged scale taken on line 4—4 of Fig. 3. Fig. 5 is a disassembled perspective of the elements of the device for controlling the discharge of the liquid from the cylinders.

The invention is exemplified in a shock absorber comprising a casing A which is provided at its sides with projecting lugs $a$ whereby it may be bolted to the sill of a vehicle frame. This casing has formed in its upper portion a chamber $a^2$ for a rocker lever $c'$ which is secured to the transverse rock-shaft C by interfitting longitudinal ribs $c^{20}$. The rock-shaft C is journalled in the casing. An arm H is connected to one end of the shaft C which projects from one side of the casing, and the distal end of this arm is connected in any suitable manner to the vehicle axle or some part secured thereto, so that relative movement between the axle and the vehicle-frame or body will oscillate the arm H to rock shaft C and operate the lever $c'$ responsively to the up and down movements of the vehicle frame permitted by the usual leaf-springs interposed between the axle and the frame. The inner end of shaft C is journalled in a bushing $c^5$ which is held in a closed bearing $c^9$ which is integrally formed with the back wall of the casing and in a bearing sleeve $c^{10}$ which is pressed into and rigidly held in the front wall of the casing. A packing box 14 is provided in the front wall of the casing to prevent leakage around the shaft. Cylinders $a^4$ and $a^5$ extend downwardly from the chamber $a^2$, and are substantially parallel and side by side. The lower ends of the cylinders are closed by a wall integral with the casing. Pistons D are slidable in the cylinders respectively. The upper end of each piston is bifurcated, as at $d$, and the ends of lever $c'$ are also bifurcated. Each piston is connected to one end of the rocker-lever $c'$ by a pitman $d^2$ which has its lower end pivotally connected to a piston by a pin $d^3$ and its upper end pivotally connected by a pin $d^4$ which is held in one of the bifurcated ends of the lever. Rotative movement of the shaft C in either direction will rock the lever $c'$ and simultaneously impart opposite reciprocatory movement to the pistons through the pitman $d^2$. The chamber $a^2$ and the cylinders, the upper ends of which are in communication therewith, are completely filled with a suitable liquid, such as oil. To permit the pistons D, levers $c'$ and pitman $d^2$ to be inserted in the casing after they have been assembled, the top of the casing is formed by a removable cover or plate 17 which is secured to the body of the casing by bolts 18. The oppositely moving pistons, operated responsively to relative movement between the axle and the vehicle frame, cause the liquid to be simultaneously drawn into the lower end of one cylinder and to be compressed in the lower end of the other cylinder, so that the shock absorber will act to retard movement of the vehicle during both the up and down-strokes of the vehicle frame. To permit the free flow of liquid from the chamber $a^2$ into the cylinders respectively, during the alternating upstrokes of the pistons, a pair of vertical ducts $a^8$ are formed in the casing and have their lower ends respectively connected to the cylinders by ducts $a^9$. To prevent backflow of the liquid through the ducts $a^9$ during the compression strokes of the pistons respectively, each duct $a^8$ is formed with a valve seat $a^{10}$ for a ball-valve $a^{11}$ which is normally held closed by a coil spring $a^{12}$ which is held on the stem $a^{13}$ on a screw-plug $a^{14}$ which closes the lower end of duct $a^8$. This construction provides for ready access to the valves, the plugs being removable for that purpose.

The fluid compressed by the pistons in the lower ends of the cylinders respectively, passes back to the chamber $a^2$ through vertical ducts $f$ which open at their upper ends into the chamber $a^2$ and are connected at their lower ends by ducts $f'$ to the cylinders respectively. To restrict the escape of the liquid under compression in the cylinders, an adjustable device G, separately formed from the casing, is provided adjacent the lower end of each vertical duct $f$. Each of said restricting devices comprises a member or plug $g$ which is pressed or otherwise suitably secured in the duct $f$ and against a shoulder $f^2$, and an adjustable member $g'$. The latter member is provided with a screw-threaded portion $g^2$ which is threaded into the lower end of its duct $f$ which extends through the lower end of the casing; a reduced portion or neck $g^3$ above portion $g^2$, an enlarged portion $g^4$ above the neck $g^3$, which fits snugly in the duct $f$, and a nipple or nozzle $g^5$ at its upper end. Oblique ports $g^6$ lead from the lower side of portion $g^4$ and merge into a common central duct $g^7$ which extends to the upper end of the nozzle $g^5$. Member $g$ is formed with a socket $g^8$ into which the nozzle $g^5$ extends. The socket is of sufficient diameter and its top is spaced slightly from the upper end of the nozzle $g^5$ to permit the liquid to flow laterally between the top of the nozzle and the top of the socket and thence downwardly or in reverse direction to the space $g^{10}$ between the lower end of member $g$ and the upper surface of enlarged portion $g^4$ of member $g'$. The socket is preferably flared downwardly, so that by adjustment of the nozzle, the area of the space around it for the escape of liquid may be increased or decreased. Ports $g^{11}$ extend vertically through the member $g$ outwardly of the socket $g^8$ so that the liquid from space $g^{10}$ may pass upwardly into the duct $f$. The screw-connection between portion $g^2$ of member $g'$ and the casing permits the nozzle of member $g'$ to be adjusted vertically to vary the flow through the member $g$, so that the action of the absorber may be regulated to suit different vehicles or vehicles carrying different loads. A screw-threaded stem $g^{12}$ projects from the lower end of member $g$ and is provided with a kerf $g^{13}$, so that it may be rotated. A nut $g^{14}$ is adapted to clamp a packing $g^{15}$ and washer $g^{16}$ against the lower end of the casing to prevent leakage of liquid from the port $f$.

To insure the filling of the cylinders and prevent any jerky action, particularly during the initial intake strokes of the pistons, a small by-pass $g^{17}$ connects the lower ends of the ducts $f$ which are in constant communication with the cylinders respectively through ports $f'$. This insures the complete filling of the cylinders at all times during the intake strokes of the piston, and assists in preventing backlash which results from incompletely filled cylinders.

The operation will be as follows: When the vehicle is subjected to a shock which will cause the vehicle body or frame to move in either direction, arm H will rock shaft C and the lever $c'$ to operate one of the links $a^2$ to retract one of the pistons D and the other link to move the other piston outwardly or downwardly. The upwardly moving piston will initially receive liquid from the cylinder under compression through by-pass $g^{17}$ and will also draw liquid into its cylinder through inlet duct $a^8$, past valve $a^{11}$ and through port $a^9$. The downwardly moving piston D will compress the liquid in its cylinder and force it through the ports $g^6$ and $g^7$ into the upper end of socket $g^8$ of member $g$, from which it will flow downwardly or in reverse direction around the nozzle $g^5$ into the space $g^{10}$ and thence through ducts $g''$ into the port $f$ from which it will flow into the chamber $a^2$. The rate of flow through the device G is so restricted that the movement of the vehicle frame will be checked or retarded. The course of the liquid is sinuous so that the use of a discharge valve is unnecessary. Furthermore, this sinuous flow produced by the device G causes the noise produced by forcing the liquid through the restricted ports to be muffled or eliminated. During the return stroke, the oppositely working piston will, in like manner, check the rebound of the vehicle.

The construction described exemplifies one in which valves for controlling the discharge of the liquid under pressure during the compression stroke are dispensed with; in which the restricted flow may be regulated to a nicety without the use of a spring-closed valve; in which the sound produced by the forcing of the liquid from the restricted port is muffled; and in which provision is made for insuring the complete filling of the cylinders through a small by-pass between the cylinders so that a small quantity of the liquid under compression will be forced into the cylinder under suction. The invention also exemplifies an improved construction in which the cylinders are vertically arranged in side-by-side relation with their axes parallel, and in which the lower ends of the cylinders are integrally formed with the casing.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a shock absorber for vehicles, the combination of a casing containing a liquid, a cylinder in the casing, a piston in the cylinder, means for operating the piston in the cylinder to alternately compress and draw liquid into the cylinder, and a device for restricting the discharge of the liquid under compression comprising means forming a discharge duct and a pair of stationary members in the duct having ports to cause the liquid to flow in a sinuous path in passing through the members.

2. In a shock absorber for vehicles, the combination of a casing containing a liquid, a cylinder in the casing, a piston in the cylinder, means for operating the piston in the cylinder to alternately compress and draw liquid into the cylinder, and a device for restricting the discharge of the liquid under compression comprising means forming a discharge duct and a pair of stationary members in the duct, one of which is provided with a socket and the other with a nozzle extending into the socket, the members having ports which will cause the liquid to successively flow in reverse directions.

3. In a shock absorber for vehicles, the combination of a casing containing a liquid, a cylinder in the casing, a piston in the cylinder, means for operating the piston in the cylinder to alternately compress and draw liquid into the cylinder, and a device for restricting the discharge of the liquid under compression comprising a discharge duct and a pair of members in the duct, one of which is provided with a cup-shaped socket having a closed end and the other with a nozzle extending into the socket to discharge the liquid against said closed end, the socket member being provided with a port to permit the liquid to flow through it to the duct.

4. In a shock absorber for vehicles, the combination of a casing containing a liquid, a cylinder in the casing, a piston in the cylinder, means for operating the piston in the cylinder to alternately compress and draw liquid into the cylinder, and a device for restricting the discharge of the liquid under compression comprising a discharge duct and a pair of members in the duct, one of which is provided with a cup-shaped socket and the other with a portion fitting the duct, and a nozzle extending into the socket, the members being provided with ports to permit the liquid to flow successively through the said portion, thence through the nozzle into the socket, and through the cup-shaped member.

5. In a shock absorber for vehicles, the combination of a casing containing a liquid, a cylinder in the casing, a piston in the cylinder, means for operating the piston in the cylinder to alternately compress and draw liquid into the cylinder, a device for restricting the discharge of the liquid under compression, comprising a discharge duct and a pair of members in the duct, having ports to cause the liquid to flow in a sinuous path in passing through the members, and means for adjusting one of the members to regulate the outflow of liquid.

6. In a shock absorber for vehicles, the combination of a casing containing a liquid, a cylinder in the casing, a piston in the cylinder, means for operating the piston in the cylinder to alternately compress and draw liquid into the cylinder, a device for restricting the discharge of the liquid under compression, comprising a discharge duct and a pair of members in the duct, one of which is provided with a socket and the other with a nozzle extending into the socket, the members having ports which will cause the liquid to successively flow in reverse directions, and means for adjusting one of the members to regulate the outflow of liquid.

7. In a shock absorber for vehicles, the combination of a casing containing a liquid, a cylinder in the casing, a piston in the cylinder, means for operating the piston in the cylinder to alternately compress and draw liquid into the cylinder, a device for restricting the discharge of the liquid under compression, comprising a discharge duct and a pair of members in the duct, one of which is provided with a cup-shaped socket having a closed end, and the other with a nozzle extending into the socket to discharge the liquid against said closed end, the socket member being provided with a port to permit the liquid to flow through it to the duct, and means for adjusting the nozzle member to regulate the outflow of liquid.

8. In a shock absorber for vehicles, the combination of a casing containing a liquid, a cylinder in the casing, a piston in the cylinder, means for operating the piston in the cylinder to alternately compress and draw liquid into the cylinder, a device for restricting the discharge of the liquid under compression, comprising a discharge duct and a pair of members in the duct, one of which is provided with a cup-shaped socket, and the other with a portion fitting the duct and a nozzle extending into the socket, the members being provided with ports to permit the liquid to flow successively through the said portion, thence through the nozzle into the socket, and through the cup-shaped member, and means for adjusting the nozzle member to regulate the outflow of liquid.

9. In a shock absorber for vehicles, the combination of a casing containing a liquid, a cylinder in the casing, a piston in the cylinder, means for operating the piston in the cylinder to alternately compress and draw liquid into the cylinder, an outlet duct in the casing, a device for restricting the discharge of the liquid under compression comprising a member secured in the casing and provided with a socket, a member provided with a nozzle extending into the socket, and ports in the members, and means accessible from the outside of the casing for adjusting said nozzle-member to vary the flow of liquid.

10. In a shock absorber for vehicles, the combination of a casing containing a liquid, a cylinder in the casing, a piston in the cylinder, means for operating the piston in the cylinder to alternately compress and draw liquid into the cylinder, an outlet duct in the casing, a device for restricting the discharge of the liquid under compression, comprising a member secured in the casing and provided with a socket, a member provided with a nozzle extending into the socket, ports in the members, said nozzle member being screw-threaded to the casing and provided with means whereby it may be adjusted from the outside of the casing.

11. In a shock absorber for vehicles, the combination of a casing provided with a pair of cylinders, a chamber open to the cylinders and containing liquid, a transverse shaft journalled in the casing and adapted for rotation by the movements of the vehicle-body and extending into said chamber, pistons slidably mounted in the cylinders and connected to be shifted to simultaneously compress and draw liquid into the cylinders respectively, intake ducts for the liquid, between the cylinders and the chamber, discharge ducts for the liquid, and outflow restricting devices in the discharge ducts comprising members having a sinuous passage therein for the outflow of liquid.

12. In a shock absorber for vehicles, the combination of a casing provided with a pair of cylinders, a chamber open to the cylinders and containing liquid, a transverse shaft journalled in the casing and adapted for rotation by the movements of the vehicle-body and extending into said chamber, pistons slidably mounted in the cylinders and connected to be shifted to simultaneously compress and draw liquid into the cylinders respectively, intake ducts for the liquid, between the cylinders and the chamber, discharge ducts for the liquid, and outflow restricting devices in the discharge ports, each comprising a pair of members, one of which is provided with a socket and the other with a nozzle extending into the socket, and ports in said members through which the liquid successively passes.

13. In a shock-absorber for vehicles, the combination of a casing provided with a pair of cylinders, a chamber open to the cylinders and containing liquid, a transverse shaft journalled in the casing and adapted for rotation by the movements of the vehicle-body and extending into said chamber, pistons slidably mounted in the cylinders and connected to be shifted to simultaneously compress and draw liquid into the cylinders respectively, intake ducts for the liquid, between the cylinders and the chamber, intake-valves in said ducts, discharge ducts for the liquid, and devices in the discharge ports comprising members, one of which is provided with a cup-shaped socket having a closed end, and the other with a nozzle extending into the socket to discharge against the closed end, and ports through the members respectively, and means accessible from the outside of the casing for adjusting the nozzle-member.

14. In a shock absorber for vehicles, the combination of a casing provided with a pair of cylinders disposed in side-by-side relation and having their axes substantially parallel, a chamber over the cylinders and containing liquid, a transverse shaft journalled in the casing, operable by relative movements between the vehicle-body and the axle and extending into said chamber, a rocker-lever fixedly secured to the shaft in said chamber, pistons slidably mounted in the cylinders and connected to be shifted in opposite directions by said lever, inlet ducts for liquid extending longitudinally of the casing and leading from the chamber to the cylinders respectively, check-valves in said inlet ducts, restricted outlets to permit liquid to pass from the cylinders into the chamber, the lower ends of the cylinders being closed and integrally formed with the casing, and a removable cover for the casing, the intake and outflow ducts extending through the bottom of the casing, and plugs in the lower end of the casing for closing said ducts.

15. In a shock absorber for vehicles, the combination of a casing provided with a pair of cylinders disposed in side-by-side relation and having their axes substantially parallel, a chamber over and between the cylinders and containing liquid, a transverse shaft journalled in the casing, operable by relative movements between the vehicle-body and the axle, and extending into said chamber, a rocker lever fixedly secured to the shaft in said chamber, pistons slidably mounted in the cylinders and connected to be shifted in opposite directions by said lever, inlet ducts for liquid extending longitudinally of the casing and leading from the chamber to the cylinders respectively, check-valves in said inlet ducts, restricted outlet ducts to permit the liquid to pass from the cylinders into the chamber, and a by-pass between the outlet ducts to permit a restrict quantity of liquid to be forced under compression from one cylinder to the cylinder under suction.

16. In a shock absorber for vehicles, the combination of a casing provided with a pair of cylinders disposed in side-by-side relation and having their axes substantially parallel, a chamber over and between the cylinders and containing liquid, a transverse shaft journalled in the casing, operable by relative movements between the vehicle-body and the axle, and extending into said chamber, a rocker-lever fixedly secured to the shaft in said chamber, pistons slidably mounted in the cylinders and connected to be shifted in opposite directions by said lever, inlet and outlet ducts for liquid extending longitudinally of the casing and between the chamber and the cylinders respectively, check-valves in said inlet ducts, restricted outflow devices in the outlet ducts to permit the liquid to pass from the cylinders into the chamber, and a by-pass connecting the outlet ducts between said devices and the cylinders respectively, to permit a restricted quantity of liquid to be forced from each cylinder into the other and insure the filling of the cylinders.

Signed at Jackson, Michigan, this 19th day of January, 1927.

HERALD P. ARNT.